United States Patent [19]
Ross et al.

[11] 3,981,143
[45] Sept. 21, 1976

[54] INFRARED SUPPRESSOR

[75] Inventors: Thomas D. Ross, West Palm Beach; Samuel S. Owen, Jupiter, both of Fla.

[73] Assignee: The United States of America as represented by the Secretary of the Army, Alexandria, Va.

[22] Filed: Aug. 15, 1974

[21] Appl. No.: 497,786

[52] U.S. Cl. .................................. 60/264; 60/266; 60/39.5; 60/39.66
[51] Int. Cl.² .................. F02K 1/26; F02C 7/18
[58] Field of Search ............... 60/39.5, 39.66, 264, 60/266; 417/408, 409; 415/143, 175

[56] References Cited
UNITED STATES PATENTS

| | | | |
|---|---|---|---|
| 2,578,481 | 12/1951 | Lombard | 417/409 |
| 2,672,013 | 3/1954 | Lundquist | 417/409 |
| 2,826,895 | 3/1958 | English | 60/39.66 |
| 2,998,700 | 9/1961 | Chaplin | 60/264 |
| 3,210,934 | 10/1965 | Smale | 60/39.5 |
| 3,418,808 | 12/1968 | Rich | 60/39.66 |

FOREIGN PATENTS OR APPLICATIONS

| | | | |
|---|---|---|---|
| 469,231 | 11/1950 | Canada | 60/39.66 |
| 556,105 | 9/1943 | United Kingdom | 60/39.66 |

*Primary Examiner*—William L. Freeh
*Assistant Examiner*—Robert E. Garrett
*Attorney, Agent, or Firm*—Nathan Edelberg; Norman L. Wilson, Jr.

[57] ABSTRACT

Successful flight of high altitude military aircraft is dependant, in part, upon the ability of the aircraft to remain undetected during flight. However, the hot gas plume is a prime source of infrared radiation, and highly sophisticated infrared sensors have been developed in recent years. A particularly effective infrared radiation suppressor is the plug-type exhaust system. This invention increases heat exchange relationships in the plug-type infrared radiation suppressor without significantly penalizing engine power during suppressor operation.

1 Claim, 3 Drawing Figures

INFRARED SUPPRESSOR

BACKGROUND OF THE INVENTION

This invention relates to improvements in apparatus for suppressing infrared emission.

As acknowledged by the prior art, the successful flight of high altitude military aircraft is dependent, in part, upon the ability of the aircraft to remain undetected during flight. Unfortunately, the gas stream discharge from a gas turbine engine is a high temperature gas mixture. Because of their high temperatures, the exhaust gases and the hot metal walls directly in contact with the hot gases, are excellent sources of infrared energy to be detected. Hence, against the highly sophisticated infrared sensors developed during recent years, particularly for military use, an aircraft powered by a gas turbine engine is at a particular disadvantage. Attempts have been made to reduce infrared emission in gas turbine engines by the use of various cooling assemblies; and the most effective arrangements have been those designed to cool the hot metal walls. However, the hot gas plume is still a prime source of infrared radiation. Most exhaust cooling designs entail either too great a power loss in operation, or a high degree of complexity and weight.

A particularly effective infrared suppressor is described in U.S. Pat. No. 3,210,934. In this apparatus a jet engine exhaust nozzle known as the plug type is described. The walls of the exhaust passage, that is, the outer engine casing walls, and the plug walls, are cooled by either ambient ram air or by engine bypass air. This bypass air, which is substantially cooler than the exhaust gases, also mixes with the exhaust gases to lower the turbine exit gas temperature.

In accordance with the practice of this invention, additional cooling means for jet engine exhaust nozzles of the plug type are provided which utilize nonaerodynamic space. This invention, therefore, effectively and simply increases heat exchange relationships in plug type infrared radiation suppressors without significantly penalizing engine power during suppressor operation.

SUMMARY OF THE INVENTION

The invention herein, as previously noted, pertains to an infrared emission suppression exhaust fluid nozzle for a jet engine having a tubular casing and an inner plug mounted coaxially within the casing. The periphery of the plug, and the inner casing wall, form an engine exhaust duct of tortuous configuration such that the casing inlet and outlet are concealed from each other, to block direct radiation of engine infrared radiation sources. In such infrared radiation suppressors, it is known to provide means for cooling portions of the exhaust duct casing and of the plug walls to reduce their infrared emissivity level. This invention includes (a) a blower coaxially mounted on the aft end of the turbine shaft to be driven, thereby, and (b) a blower inlet plenum in combination with (c) a blower outlet cone, and (d) a blower outlet flow divider. The blower is provided with circumferentially disposed blades which revolve annularly about the turbine axis. The blower inlet plenum reduces blower inlet air turbulence to promote even distribution of inlet air to the annular blower. The blower outlet cone is coaxially disposed within the blower annulus to form an annular blower air outlet diffuser duct. The blower air outlet flow divider is positioned in this duct to divert a portion of the blower outlet air to the plug wall cooling means, and a portion to the exhaust duct casing cooling means, by means of the interior of the rear portion of the outer case supporting vanes.

DETAILED DESCRIPTION OF THE INVENTION

As indicated, in the infrared radiation attenuation apparatus of the invention, the aft duct contains a core or plug to optically hide or mask the view of hot metal surfaces. This aft duct and the application of the invention thereto, will best be understood by referring to the following detailed description of the invention and the drawings referred to therein.

Figure 1:
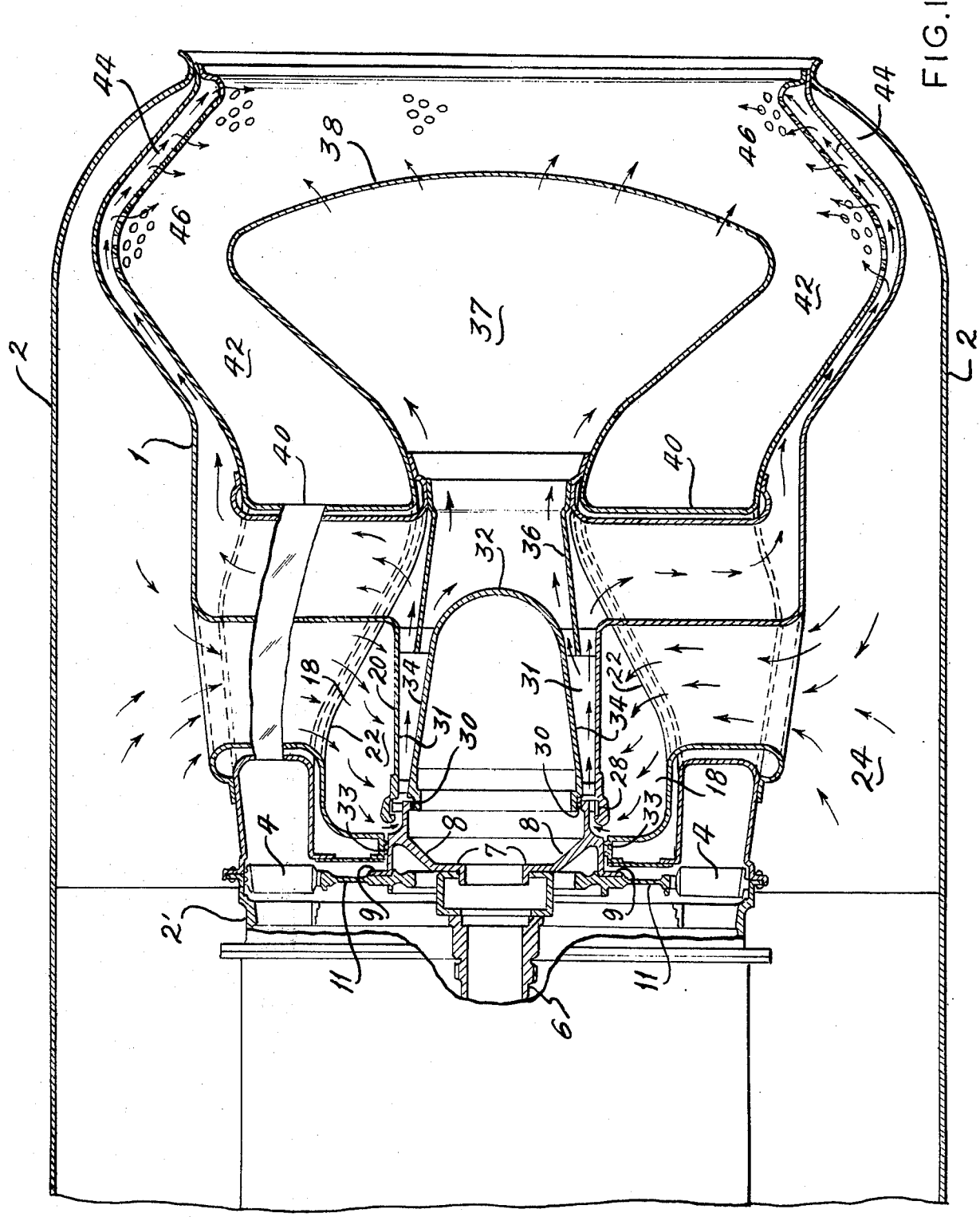
FIG. 1 is a schematic axial sectional view of the aft duct.

In FIG. 1, there is shown the aft turbine engine nacelle 2 of a turboshaft (or turbopropeller) engine which houses the infrared countermeasure apparatus 1. The details of a gas turbine engine are well known and need not to be described in detail herein. The engine generally includes a compressor which pressurizes ambient air to a high level, and a combustor which receives the pressurized air and combines it with fuel to form a fuel-air mixture which is suitably ignited to produce a hot gas stream. From there, the gases flow thru a turbine which drives the compressor. They then flow either to a power turbine, which extracts energy in the form of a rotary torque output, or to a reaction nozzle, which extracts the energy in the form of a propulsive thrust. In either case, the temperature of the gases leaving the engine and the temperature of the engine components are extremely high. Within turbine case 2', the last stage turbine blades 4 normally journaled to turbine shaft 6, are modified to accomodate the apparatus of the invention. Coupled or journaled to shaft 6 in lieu of the last stage turbine disc is the inner rim 7 of blower disc 8, which rotates in response to passage of the hot exhaust gas stream across the blades of the turbine. Turbine disc 11, carrying turbine blades 4 is, consequently, bolted or otherwise secured to the outer rim 9 of blower disc 8. Blower 10, thus, is coaxially mounted on the aft end of the last turbine stage assembly.

Figure 2:
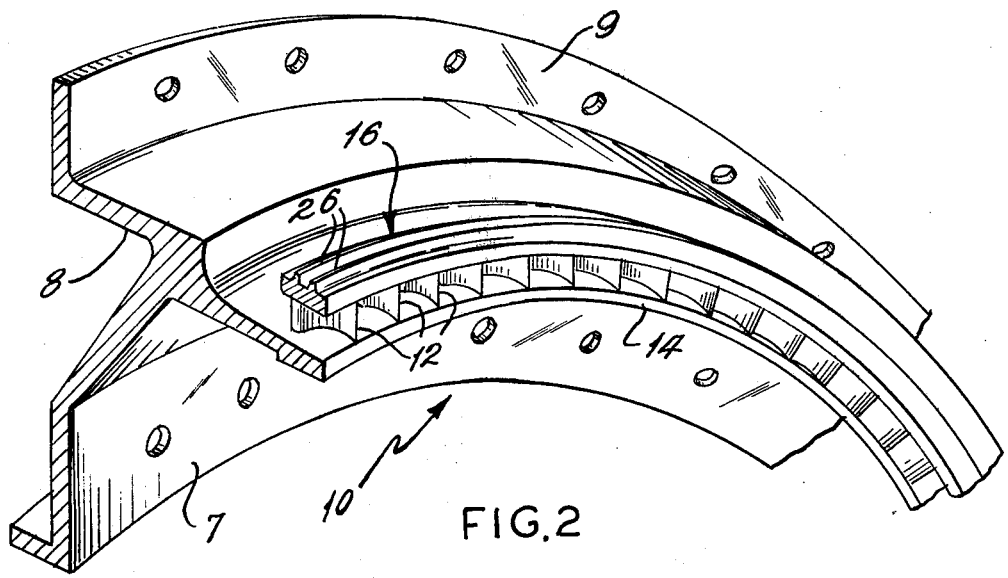
FIG. 2 is a three dimensional segmented view of a portion of the axial blower.

Blower 10 is shown in greater detail in FIG. 2. The blower is essentially an annular disc having circular inner and outer rim 7 and 9. The center portion of the blower disc carries circumferentially aligned blades 12, forming a rotating axial flow blower. Blower disc flange 14 and rotating blower shroud 16 form an enclosure for blades 12 of the axial blower.

Figure 3:
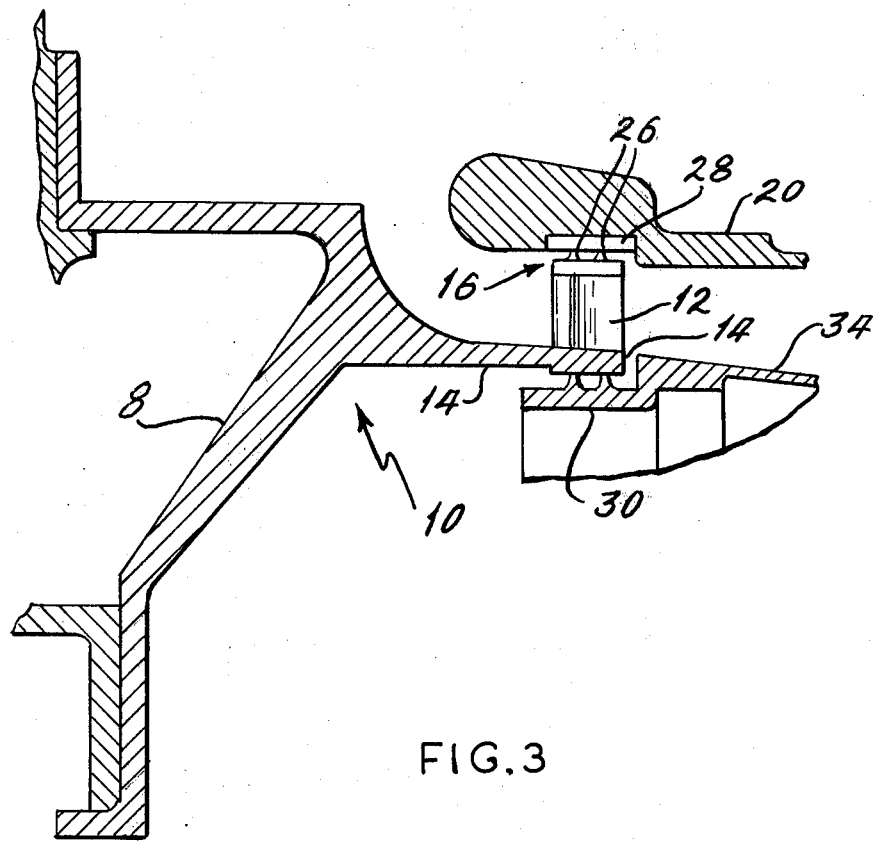
FIG. 3 is a cross sectional view of a portion of the blower inflow and outflow channels.

For effective blower operation, inflow turbulence must be minimized. To this end, inlet plenum 18 is provided. The plenum chamber of plenum 18 is, of course, also annular, being formed by inner wall 20 and outer wall 22, to receive inflow air from ambient air flow compartment 24. The blower inlet plenum utilizes the interior of the outer case supporting vanes to transmit inlet air across the hot exhaust stream. Means are also provided to eliminate the formation of a blower bypass stream. These means are best seen in FIG. 3. Blower shroud 16 is provided with ribs 26. Ribs 26 provide a rotating air seal with the inner plenum wall 20 at 28. Ribs 30 are likewise provided on the surface of cone 34 to be described hereinafter. Ribs 30 provide a stationary air seal with rotating blower support flange 14. Ribs 33 also perform this function.

Plenum 18, thus, slows the inlet air flow rate and provides low disturbance inflow air to blower 10. In addition to controlled inflow cooling air, a channeled blower outflow air stream is provided. This is achieved by means of cone 32, held by fixed struts or otherwise, within the annulus of blower 10. Side surface 34 of the conical section are disposed opposite the inner plenum surface 20 to form a blower outflow diffuser channel 31 which confines and directs the blower outflow gas stream toward diffuser splitter ring 36.

Considering now the operation of the infrared radiation suppression apparatus of this invention, the suppressor diffuser exhaust nozzle contains plug 37 held in the nozzle by struts 40. The plug forms an engine exhaust duct 42 of tortuous configuration, concealing the exhaust nozzle inlet from the outlet. The nozzle walls, which form the outer exhaust duct walls are provided with an annular duct assembly 44 in the form of heat exchangers for cooling gases in duct 42. In operation, therefore, cooling air is drawn or diverted into ambient air flow compartment 24. It flows into plenum 18 wherein it is evenly distributed to blades 12 of blower 10 mounted for rotation on the end of turbine shaft 6. The flow of outlet cooling air from blower 10 is confined in blower diffuser channel 31 which directs the cooling gas stream to diffuser splitter ring 36. By diffuser splitter ring 36 a portion of the cooling gas stream is diverted into plug 37, cooling the plug walls prior to passing through perforated end 38. Another portion of the cooling gas stream is diverted into the interior of the rear half of the supporting struts 40 and is directed into duct assembly 44 to cool the inner exhaust nozzle walls prior to being discharged into the exhaust gas thru perforated region 46.

Given the foregoing description, modification will obviously occur to those skilled in the art. Thus, the walls of the plug can change from a dull surface to a bright surface as provided in U.S. Pat. No. 3,210,934. Moreover, the invention can be used with various engine types. In addition, the last stage turbine disc need not be carried by the blower as shown in the drawings. The blower can be attached to a conventional last stage turbine disc. These and other ramifications thus are deemed to be within the scope of the invention.

What is claimed is:

1. In an infrared emission suppression exhaust fluid nozzle for a jet engine whose hot exhaust gases flow through turbine blades journaled to a turbine shaft, the exhaust fluid nozzle being the type including a tubular casing, an inner plug mounted coaxially within the casing, the periphery of the plug and the inner casing wall forming an engine exhaust duct of tortuous configuration such that the casing inlet and outlet are concealed from each other to block direct radiation of engine infrared radiation sources, and means for cooling portions of the exhaust duct casing and of the plug walls to reduce their infrared emissivity level, the combination of (a) a blower coaxially mounted on the turbine shaft at its aft end to be driven thereby, said blower having circumferentially disposed blades revolving annularly about the turbine axis, (b) a blower inlet plenum to reduce blower inlet air turbulence and to promote even distribution of inlet air to the blower and (c) means to supply air to said blower inlet plenum, with (d) a blower outlet duct, and a blower outlet cone coaxially disposed within the blower outlet duct to form an annular blower air outlet diffuser duct, and (e) a blower air outlet diffuser splitter ring positioned in said diffuser duct to split the blower airstream to divert one part of the blower outlet air to the plug wall cooling means and to divert another part of the blower outlet air to the exhaust duct casing cooling means.

* * * * *